United States Patent [19]
Ritzer et al.

[11] Patent Number: 5,126,203
[45] Date of Patent: Jun. 30, 1992

[54] DEACTIVATION OF SPENT SILICON POWDER

[75] Inventors: Alan Ritzer, Sand Lake; George P. Moloney, Jr., Halfmoon; Jack C. Leunig, Albany, all of N.Y.

[73] Assignee: General Electric Company, Waterford, N.Y.

[21] Appl. No.: 754,144

[22] Filed: Sep. 3, 1991

Related U.S. Application Data

[60] Continuation of Ser. No. 419,184, Oct. 10, 1989, abandoned, which is a division of Ser. No. 298,243, Jan. 13, 1989, Pat. No. 4,892,694.

[51] Int. Cl.$^5$ .............................................. C01B 33/08
[52] U.S. Cl. ................................. 428/403; 106/491; 423/374; 423/342; 423/348; 423/349; 428/404; 428/407
[58] Field of Search .................. 428/403, 404, 407; 106/491; 419/34, 35, 64, 65; 423/274, 324, 342, 348

[56] References Cited

U.S. PATENT DOCUMENTS

| | | | |
|---|---|---|---|
| 3,787,221 | 1/1974 | Topcik | 106/491 |
| 3,894,865 | 7/1975 | Wienert | 75/21 |
| 4,551,436 | 11/1985 | Johnson et al. | 501/90 |
| 4,724,122 | 2/1988 | Hosokawa | 419/35 |
| 4,824,652 | 4/1989 | Hosokawa | 423/348 |
| 4,892,694 | 1/1990 | Ritzer et al. | 264/109 |

*Primary Examiner*—George F. Lesmes
*Assistant Examiner*—Christopher Brown

[57] ABSTRACT

Residual silicone from direct process manufacture of chlorosilanes is stabilized for transportation and disposal by pelletizing finely divided particles of finely divided residual silicon powder contaminated with chlorine, hydrogen, and oxygen and highly reactive and exothermic upon exposure to moisture, and impregnating the pellets with an organic binder.

6 Claims, No Drawings

DEACTIVATION OF SPENT SILICON POWDER

This application is a continuation of application Ser. No. 07/419,814, filed Oct. 10, 1989, now abandoned, which is a divisional of application Ser. No. 07/298,243, filed Jan. 13, 1989, now U.S. Pat. No. 4,892,694.

The present invention relates to a process for treating silicon and residual silicon powder. More particularly, the present invention relates to a process for forming stable pellets of silicon and residual silicon powder.

BACKGROUND OF THE INVENTION

The present commercial method for manufacturing organohalosilanes is well known and is described in U.S. Pat. No. 2,380,995, issued to Rochow. This method, known as the "direct process", involves the direct reaction of an organo-halide, such as methyl chloride, with silicon particles in order to produce organochlorosilane. Intermixed with the particles of silicon are particles of copper, forming a reactive mass or a reactive contact mass. In commercial practice, the direct process is generally carried out in one of three types of equipment: the stirred bed type of reactor as described in Sellers, U.S. Pat. No. 2,449,821; the fluidized bed reactor, as described in Reed, at al., U.S. Pat. No. 2,389,931; or the rotary kiln.

At some point in the production of the organochlorosilanes by the direct process, the reactive mass or reactive contact mass containing silicon particles becomes less reactive. Thus, spent or less reactive silicon particles are removed from the reactor and new silicon particles inserted so that a continuous reaction may continue unabated or so that a batch reaction may be restarted. The spent contact mass is generally referred to as residual silicon, residual silicon powder, residual silicon-containing contact mass or residual contact mass and these terms are used interchangeably herein.

A problem with the residual silicon is that it is highly reactive and exothermic upon exposure to moisture. Thus, disposal or transportation of the residual silicon is complicated by reaction with atmospheric moisture and other sources of water to produce heat, hydrochloric acid, hydrogen as and other products.

It is an object of the present invention to stabilize the residual silicon to permit transportation and disposal.

It is another object of the present invention to produce stable pellets of residual silicon for transportation and disposal.

DETAILED DESCRIPTION OF THE INVENTION

Briefly, according to the present invention, there is provided a process for stabilizing residual silicon comprising:
(a) pelletizing the residual silicon and
(b) impregnating the pellets with an organic binder.

The residual silicon is a finely divided powder having an average particle diameter in the range of from about less than 1 to about 200 microns. It is contaminated with a variety of substances with silicon on an elemental basis comprising about 50 to about 85% by weight. Other significant elements present include, of course, chlorine, hydrogen and oxygen in addition to copper, carbon, iron, aluminum, zinc, calcium, tin, lead titanium, manganese and others.

The residual silicon may be pelletized by pressure compaction or by mixer agglomeration. Pressure compactor includes, for example, a piston or molding press, a tableting press, a roll-type press, a pellet mill or a screw extruder. The preferred method of pelletizing is by mixer agglomeration, which may be accomplished on, for example, an inclined pan or disk, i.e. a rotary-drum agglomerator, a paddle mixer, i.e. a pug mill, or a flow mixer. The preferred method of mixer agglomeration is by use of an inclined pan.

As a general proposition, the larger and denser the pellet, the less surface area available for reaction. Preferred pellet diameters range from about 1/16 inch to about ¾ inch. Pellets that are too large are difficult to handle and may develop hot reaction points within the pellet.

The organic binder is applied to impregnate the pellet either at the time of pelletization or in a subsequent step. The binder may be at 100% liquid organic binder, where it is of sufficiently low viscosity to penetrate the pellet, or it may be applied in solution or emulsion.

The organic binder should be such that it will penetrate the pellet and improve cohesiveness therein. Preferred organic binders include, for example, glucose, glues, gums, asphalt, resins, starch, waxes with a preferred binder being lignin. Although organic polymers can be utilized, such as, acrylic polymers or epoxy polymers, they are not preferred due to expense.

The preferred binder is lignin, due both to its availability at low cost and to its easy water solubility. Suitable lignin includes sulfite lignins from the sulfite pulping process (e.g. calcium or sodium lignosulfate), alkali lignins from kraft and soda pulping processes, furafil from cereal waste, hydrolysis lignin from glucose production and the like. Persons skilled in the art will easily recognize suitable lignin.

The solvent or emulsion carrier may be either an organic solvent or water. Where water is utilized, it should be used in such amounts that it will act not only as a solvent or emulsion carrier but as a heat transfer fluid to quench the heat of reaction. Such heat of reaction results from the reactivity of the water with the residual silicon. In spite of its reactivity, water is preferred because of solvent emission problems with organic solvents.

The organic binder is applied to the pellets in sufficient amount that the cohesiveness of the pellet as well as its stability is improved. Thus, not only will the binder act as an adhesive to prevent the pellet from disintegrating, but it will also serve to coat the individual particles of the pellet and prevent their uncontrolled contact with moisture. It is desirable that impregnation of the pellet be sufficient that the pellet will not exceed about 50° C. upon exposure to moisture and atmospheric oxygen. Generally, a water solution or emulsion bath of organic binder containing from about 25% to about 75% by weight solids will provide the desired impregnation.

The resultant pellets may be air dried or oven dried to remove solvent and to cure or set-up the binder material. Of course, it is preferable to avoid heating costs where possible so air drying is preferred. However, oven drying may be desirable in some instances to produce a more durable pellet.

The above described method will produce pellets that are safe for transportation to ultimate disposal sites. Persons skilled in the art can easily imagine suitable variations.

The following examples are illustrative of aspects of the present invention and are not in any way intended to limit the scope of the invention.

EXAMPLES

Residual silicon powder having a bulk density of 68 lb/ft$^3$ was pelletized in a 3-ring drum pelletizer at a 30° angle to produce ¼ inch diameter pellets. Water, organic solids, and organic solutions in water as shown below were employed as binders. Water and organic solutions in water were sprayed through the pelletizer as necessary to form the green pellets and cool the reaction. Green pellets were air dried and oven dried at 250° as shown and subjected to drop and crush tests. The figure shown for the drop test was the number of times that pellets survived drops from 18 inches before breakage. The figure shown for the crush test is in pounds and is the load that must be applied across the diameter of a pellet before it fragments or crumbles.

FIG. 1

| Binder | Water | 5% Starch Dry Mixed | 30% Starch Solution | 5% Sodium Silicate Solution | 50% Sodium Silicate Solution | 12.5% Lignin Solution | 25% Lignin Solution |
|---|---|---|---|---|---|---|---|
| Bulk Density (lb/ft$^3$) | | | | | | | |
| Green Pellets | 50.7 | 41 | 44.8 | 46.8 | 49.7 | 47.8 | 52.5 |
| Liquid (wt %) | | | | | | | |
| Green Pellets | 8 | 8 | 9.5 | 8.5 | 8 | 8 | 9 |
| Air Dried Pellets | 4.0 | 5.1 | 3.5 | 4.0 | 3 | 3 | 3.8 |
| Drop Test | | | | | | | |
| Green Pellets | 6 | 3 | 6 | 2 | 2 | 6 | 7 |
| Air Dried Pellets | 12 | 4 | 24+ | 2 | 10 | 12 | 24+ |
| Oven Dried Pellets | 1 | 3 | 24+ | 1 | 18 | 3 | 24+ |
| Crush Test | | | | | | | |
| Green Pellets | 1 | 1 | 2 | 1 | 3 | 1 | 4 |
| Air Dried Pellets | 1 | 1 | 20 | 1 | 11 | 6 | 20 |
| Oven Dried Pellets | 5.5 | 1 | 3 | 1 | 2 | 2 | 13 |

What is claimed is:

1. A pellet stable for safe transportation comprising:
   (a) particles of finely divided residual silicon powder contaminated with chlorine, hydrogen, oxygen and carbon which is highly reactive and exothermic upon exposure to moisture and
   (b) a binder consisting of an organic binder selected from starch or lignin sufficient to prevent the pellet from disintegrating, to coat the individual particle of the pellet and to prevent uncontrolled contact of the particles with moisture.

2. The pellet of claim 1 wherein there is sufficient organic binder that the temperature of the pellet will not exceed about 50° C. upon exposure to moisture and atmospheric oxygen.

3. The pellet of claim 1 wherein the organic binder is applied to the pellet in a carrier.

4. The pellet of claim 3 wherein the carrier is water.

5. The pellet of claim 3 wherein the carrier is a solvent.

6. The pellet of claim 1 wherein the organic binder is water soluble.

* * * * *